(12) United States Patent
Kissel, Jr.

(10) Patent No.: US 9,545,083 B2
(45) Date of Patent: Jan. 17, 2017

(54) ANIMAL HARNESS ARRANGEMENT AND ASSOCIATED BUCKLE CONSTRUCTION

(71) Applicant: WFK & Associates, LLC, Gainesville, FL (US)

(72) Inventor: Waldemar F. Kissel, Jr., Gainesville, FL (US)

(73) Assignee: WFK & Associates, LLC, Gainesville, FL (US)

( * ) Notice: Subject to any disclaimer, the term of this patent is extended or adjusted under 35 U.S.C. 154(b) by 0 days.

(21) Appl. No.: 14/948,817

(22) Filed: Nov. 23, 2015

(65) Prior Publication Data

US 2016/0143252 A1    May 26, 2016

Related U.S. Application Data

(63) Continuation of application No. 13/947,347, filed on Jul. 22, 2013, now Pat. No. 9,192,145.

(60) Provisional application No. 61/673,954, filed on Jul. 20, 2012.

(51) Int. Cl.
*A01K 27/00* (2006.01)
*A44B 11/00* (2006.01)

(52) U.S. Cl.
CPC ............. *A01K 27/002* (2013.01); *A44B 11/00* (2013.01)

(58) Field of Classification Search
CPC .............................. A01K 27/00; A01K 27/002
USPC .......................... 119/712, 769, 792, 793, 850
See application file for complete search history.

(56) References Cited

U.S. PATENT DOCUMENTS

| 2,233,397 | A | 3/1941 | Bloom |
| 5,660,146 | A | 8/1997 | Sporn |
| 6,314,915 | B1 | 11/2001 | Pope et al. |
| 2008/0047501 | A1 | 2/2008 | Madere et al. |
| 2008/0177210 | A1 | 7/2008 | Larson |
| 2009/0000570 | A1 | 1/2009 | Ashby |

FOREIGN PATENT DOCUMENTS

| DE | 202011050156 U1 | 7/2011 |
| EP | 0691076 A1 | 1/1996 |
| WO | 2009025018 A1 | 2/2009 |

*Primary Examiner* — Monica Williams
(74) *Attorney, Agent, or Firm* — GrayRobinson, P.A.; Michael J. Colitz, III (57) ABSTRACT

Disclosed are harness assemblies for use in tethering a pet, such as a dog, to a leash. The harness assemblies distribute the forces associated with restraining the animal over the animal's entire body. The harness assemblies also provide a wide range of adjustability and are easy to position upon or take off the animal. Various buckle constructions are also disclosed for use in easily securing the harness onto an animal. The various components of the present invention, and the manner in which they interrelate, are described in greater detail hereinafter.

5 Claims, 7 Drawing Sheets

ANIMAL HARNESS ARRANGEMENT AND ASSOCIATED BUCKLE CONSTRUCTION

CROSS-REFERENCE TO RELATED APPLICATIONS

This application claims priority to and is a continuation of U.S. patent application Ser. No. 13/947,347 filed Jul. 22, 2013, entitled "Animal Harness Arrangement and Associated Buckle Construction" now U.S. Pat. No. 9,192,145, issued Nov. 24, 2015, which itself claimed priority to Provisional Patent App. No. 61/673,954 filed on Jul. 12, 2012, entitled "Quick Connect/Disconnect Canine Body Harness Buckle Assembly," the contents of which are fully incorporated herein for all purposes.

TECHNICAL FIELD

This disclosure relates to various harness arrangements for animals. The disclosure further relates to animal harnesses and associated buckle constructions. The present disclosure further relates to a buckle that is used in connection with harness straps and connectors to form a easy to use, easy to adjust, comfortable, secure body harness assembly for a canine pet. The disclosed buckle may also be used as a canine footwear suspenders buckle.

BACKGROUND OF THE INVENTION

The present invention relates to body harnesses that are connected to a hand held leash for controlling a pet. Dog collars are traditionally used for the same purpose. However, collars can injure the neck and may also be slipped over the head. A harness provides more secure control and also spreads out the restraining force over the chest and under body of the dog. There are a variety of canine harness embodiments in use in the prior art. There are several problems with these designs. There are many variables as each harness has its own design. Existing harness assemblies are complicated. They are sewn together from many strips of webbing. They have numerous adjustment locations, but none are fully adjustable across all dimensions of restraint. Some harnesses create uncomfortable and unnecessary stress on various portions of the animals' anatomy, such as under its front leg joints. Present harnesses are complicated, difficult to adjust and difficult to put onto the animal.

The body harness and buckle assembly of the present invention is aimed at overcoming these and other shortcomings in the background art.

SUMMARY OF THE INVENTION

Therefore, it is an objective of this disclosure to provide a canine body harness and an associated buckle assembly that have a simple and inexpensive design.

It is also an objective of this disclosure to provide a canine body harness that is easier to use and easier to adjust.

It is an objective of this disclosure to provide a canine body harness that is more comfortable for the canine wearer.

It is an objective of this disclosure to provide a canine body harness that uses two webbing straps, each of whose ends terminate at an adjustable connector.

It is an objective of this disclosure to provide a canine body harness that requires adjusting only the first time it is fitted to the canine.

It is still yet another objective to provide a harness with two quick connect/disconnect buckles, wherein one of the buckles may be used as a body harness buckle and the other may be used as a footwear suspenders buckle.

BRIEF DESCRIPTION OF THE DRAWINGS

Similar reference numerals refer to similar parts throughout the several views of the drawings.

DETAILED DESCRIPTION OF THE INVENTION

The present invention relates to various harness assemblies for use in tethering a pet, such as a dog, to a leash. The harness assemblies distribute the forces associated with restraining the animal over the animal's entire body. The harness assemblies also provide a wide range of adjustability and are easy to position upon or take off the animal. Various buckle constructions are also disclosed for use in easily securing the harness onto an animal. The various components of the present invention, and the manner in which they interrelate, are described in greater detail hereinafter.

Butterfly Buckle Construction

Figure 1:
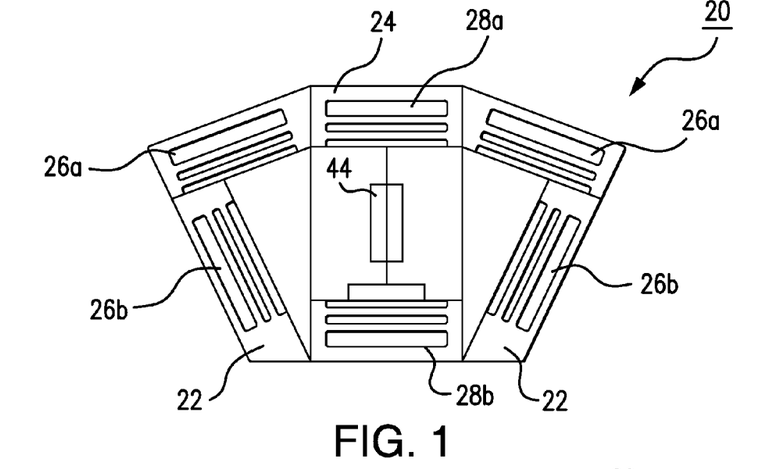
FIG. 1 is a top view of a "butterfly" buckle construction of the present disclosure.
Figure 2:
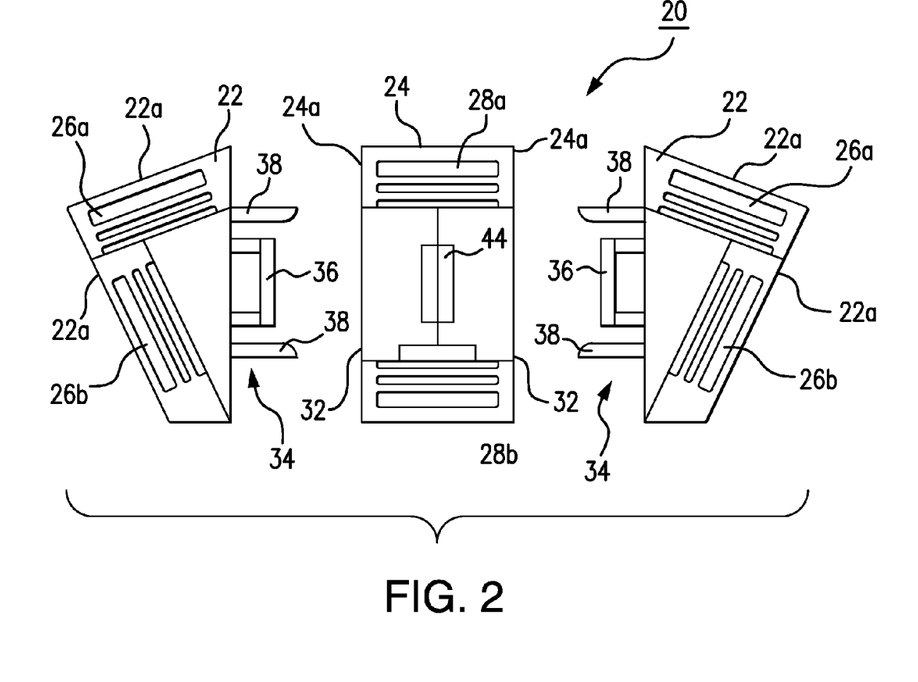
FIG. 2 is a top view of the buckle construction of FIG. 1 with the three components of the butterfly buckle uncoupled from one another.
Figure 3:
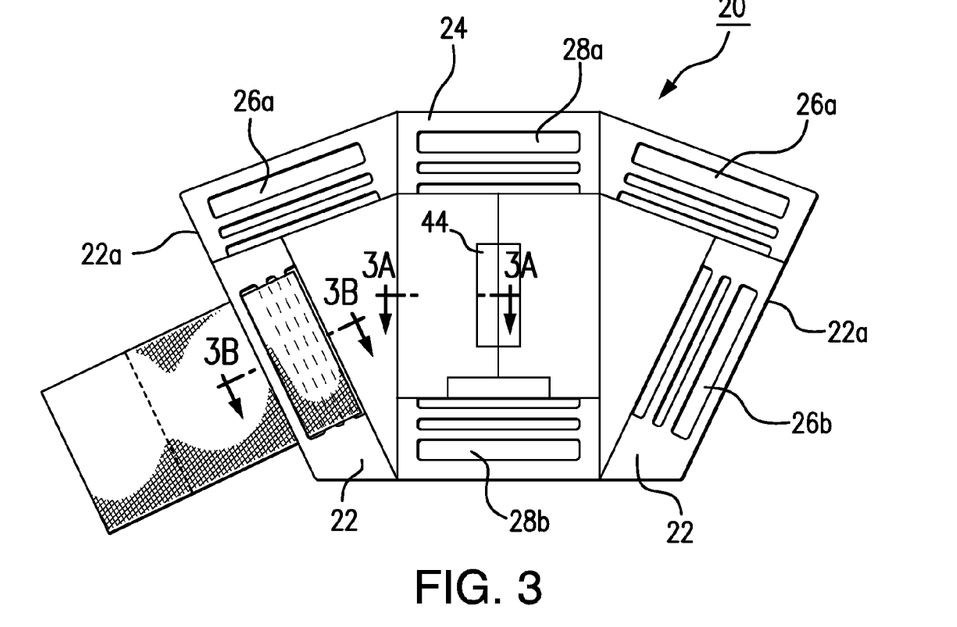
FIG. 3 is an additional view of the butterfly buckle construction of FIG. 1.
Figure 3A:
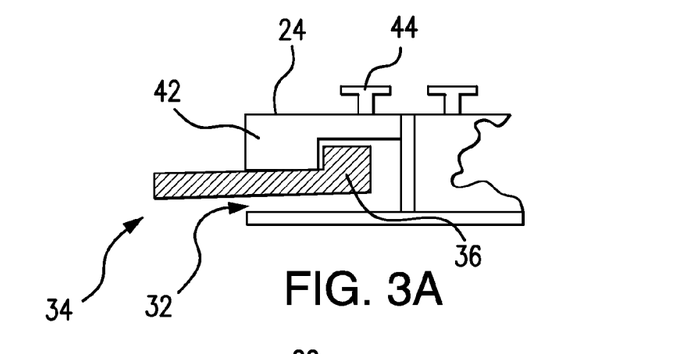
FIG. 3A is a sectional view taken along line 3A-3A of FIG. 3.

FIGS. 1-3 illustrate one of the preferred buckle constructions of the present invention. The depicted buckle is referred to herein as the butterfly buckle 20. It consists of a left and right wings components 22 and a center torso components 24. The two wing components 22 are adapted to be releasably secured to the torso component 24. All of the components also include ladder locks. Namely, the wing 22 include ladder locks 26 and the torso component includes ladder locks 28. Ladder locks are slots formed within a buckle for the purpose of permitting the buckle to be coupled to a length of webbing. As used herein, a double ladder lock refers to a lock with two slots, and a triple ladder lock refers to a lock with three slots.

With specific reference to FIG. 1, it can be seen that each of the wings includes first and second ladder locks (26a and 26b, respectively). These are preferably triple ladder locks and are positioned at approximately right angles to one another and generally parallel to the two outsides edges of the wing. The torso component likewise includes first and second triple ladder locks (28a and 28b, respectively). These ladder locks (28a and 28b) are parallel to one another. The first ladder lock 26a of one of the wings 22 is adapted to accept a harness strap that starts above the front shoulder of the animal and that passes over the side of the dog's neck. The second ladder lock 26b of the wing 22 accepts a strap that goes down the side of the dog. The first and second ladder locks (26a and 26b) on the opposite wing 22 accept harness straps that are similarly positioned on the opposite side of the animal.

Opposing female slots 32 are included within the lateral edges of the center torso component 24. Each female slot 32 is adapted to lockingly receive a male element 34 from one of the wing components 22. Each male element 34 consists of a central latch 36 and two laterally disposed guides 38. The female slot 32 includes a latching edge 42 for releasably receiving a corresponding latch 36. During insertion, guides 38 ensures proper positioning while the central latch 36 locks over latching edge 42 within female slot. Once fully inserted, the latches 36 lock each wing 22 in place within the torso component 24. Wing components 22 can be released by pressing a release button 44 that pushes latch 36 down off the latching edge 42. Both wing components 22 are symmetrical and lock in an identical fashion.

The lateral edges 24a of the torso component 24 are disposed at less than a 90 degree angle to the two outsides edges 22a of the opposing wing components 22. Outside edges 22a are disposed at approximately a 90 degree angle to one another. With all components interconnected, the butterfly buckle 20 takes the form of a hexagon.

Y Buckle Construction

Figure 6:
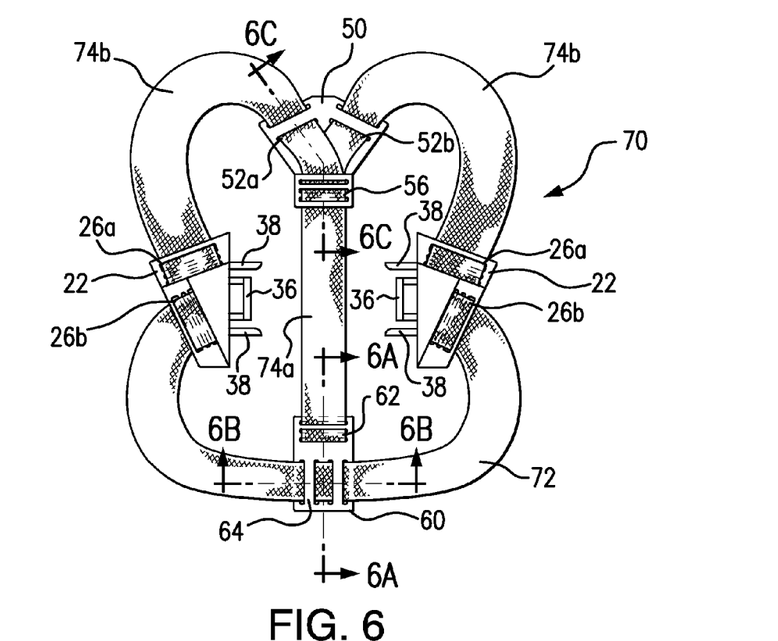
FIG. 6 is a plan view of another harness and buckle assembly that employs a "Y" buckle construction and a "ladder" buckle construction.
Figure 7:
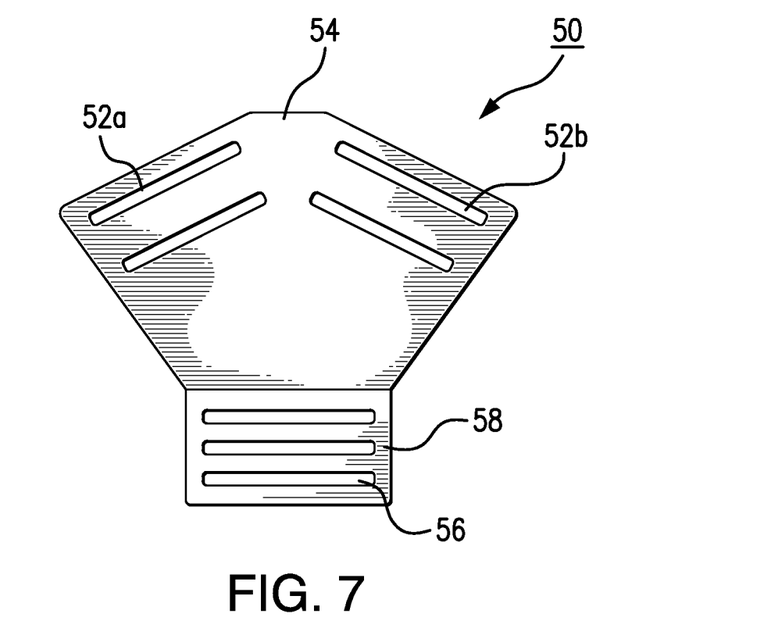
FIG. 7 is a detailed top plan view of the "Y" buckle construction of FIG. 6. This buckle is designed for use across the chest area of an animal.

The Y buckle construction 50 is depicted in FIG. 7. The Y buckle 50 is adapted to be positioned over the chest of the animal. Accordingly, Y buckle 50 is alternatively referred to as a chest buckle. It is depicted in use within a harness in FIGS. 5, 6, and 11. As noted, preferred Y buckle 50 includes two angled double ladder locks (52a and 52b) at a first end 54. It also includes a triple ladder lock 56 at a second end 58. The preferred Y buckle 50 brings together two different harness straps. More specifically, a first strap is routed through the slots of ladder lock 52a on one side and a second strap is routed through the slots of ladder lock 52b on the other side. These two different webbings are then overlaid and routed through the slots of ladder lock 56. Also, ladder locks 52a and 52b are disposed at an angle to one another.

Ladder Buckle Construction

Figure 8:
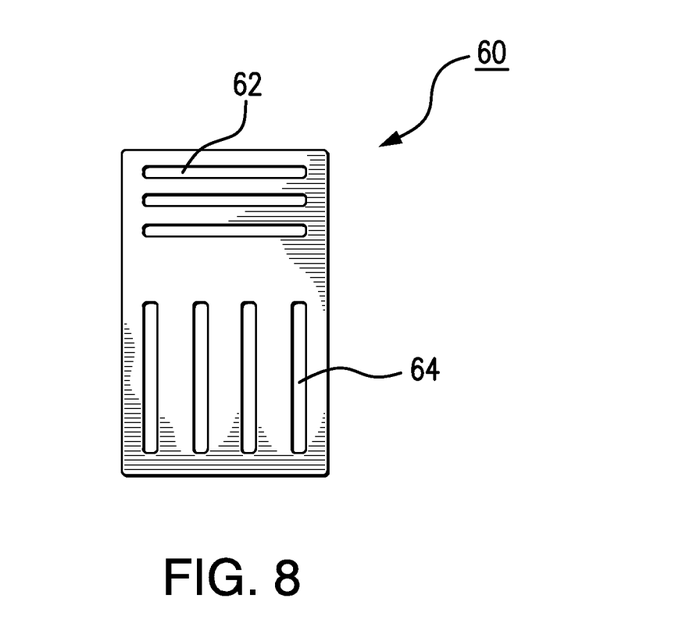
FIG. 8 is a detailed top plan view of the "ladder" buckle construction depicted in FIG. 6. The ladder buckle construction is for use in connecting perpendicular webbing straps.

A further buckle construction is depicted in FIG. 8. The depicted buckle is a ladder buckle 60. It is designed to be positioned along the waist of the animal and is alternatively referred to as a waist buckle. Ladder buckle 60 is rectangular in shape. It is shown in position upon a harness in FIGS. 5 and 6. Namely, a first triple ladder lock 62 is disposed at a first end of buckle 60. A second quadruple ladder lock 64 is disposed at a second opposite end of buckle 60. The slots of ladder lock 62 are disposed at a right angle to the slots of ladder lock 64. As a result, ladder buckle 60 can be used to interconnect perpendicular strips of webbing.

Sling Harness Arrangement

Figure 4:
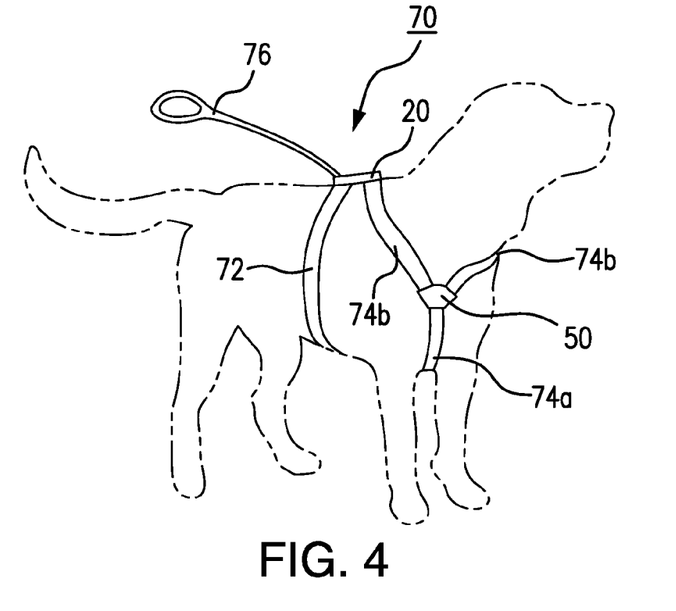
FIG. 4 is a depiction of a dog wearing a harness and buckle assembly.
Figure 5:
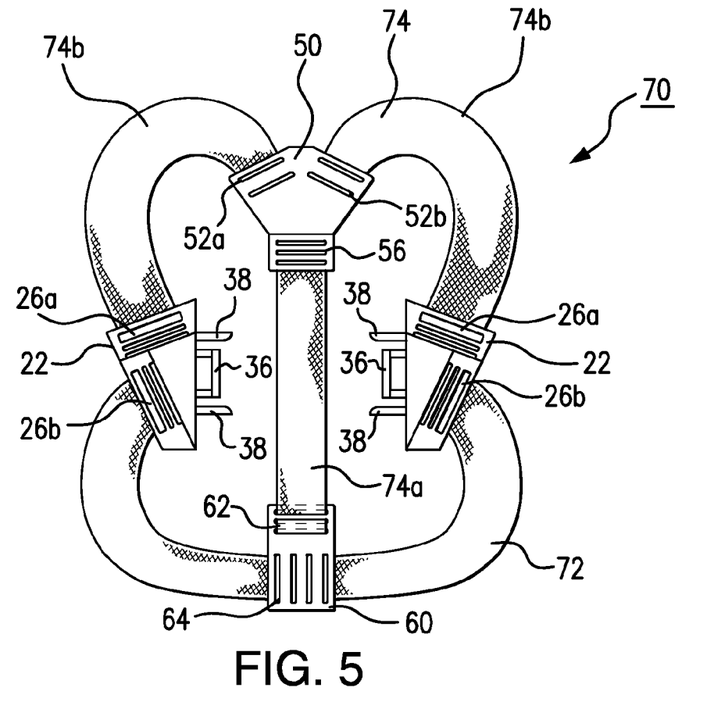
FIG. 5 is a plan view of a harness and buckle assembly.

The sling harness arrangement 70 is described next in connection with FIGS. 4, 5, and 6. The sling harness 70 consists of a waist strap 72, a chest strap 74, a Y buckle 50 and a ladder buckle 60. Once is position upon the animal, the chest strap 74 includes a bottom extent 74a and two shoulder extents (74b and 74b). The arrangement of the sling harness 70 increases both comfort to the animal and the ease of its placement on and off the animal.

Figure 6A:
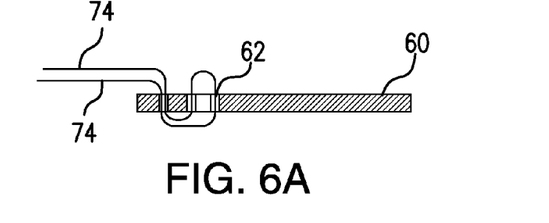
FIG. 6A is a sectional view taken along line 6A-6A of FIG. 6.
Figure 6B:
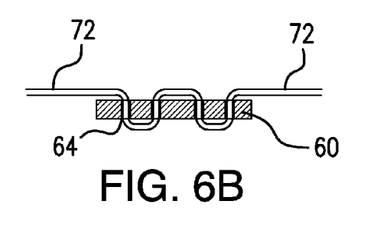
FIG. 6B is a sectional view taken along line 6B-6B of FIG. 6.
Figure 6C:
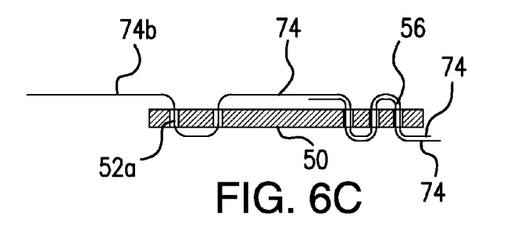
FIG. 6C is a sectional view taken along line 6C-6C of FIG. 6.

The sling harness 70 is placed upon the animal as follows. An appropriate length of waist strap 72 is first threaded through locking ladder 64 of the ladder buckle 60. Ladder buckle 60 should be centered along the length of waist strap 72. Next, a length of chest strap 74 is inserted through ladder lock 62 upon ladder buckle 60. The chest strap 74 is preferably longer than the waist strap 72. FIG. 6B shows waist strap 72 threaded through ladder lock 64. FIG. 6A shows how chest strap 74 is "double backed" through ladder lock 62. In other words, chest strap 74 doubles back on itself through ladder buckle 60. Ladder buckle 60 is preferably positioned in the center of chest strap 74. Ladder buckle 60 thereby joins waist strap 72 and chest strap 74 at the very center of each strap.

Next, the length of the canine breast bone from the expected location of the ladder buckle 60 to the expected location of the Y buckle 50 is measured. Both ends of the chest strap 74 are then threaded through the bottom ladder lock 56 of Y buckle 50. The Y buckle 50 can be slid to position chest strap 74 in accordance with the prior measurements. Next, one end of chest strap 74 is fed through ladder lock 52a while the other side of chest strap 74 is fed through ladder lock 52b. It does not matter which end of chest strap 74 goes through which ladder lock (52a or 52b). Y buckle 50 thereby segments the chest strap 74 into a bottom extent 74a and two shoulder extents 74b.

Figure 3B:
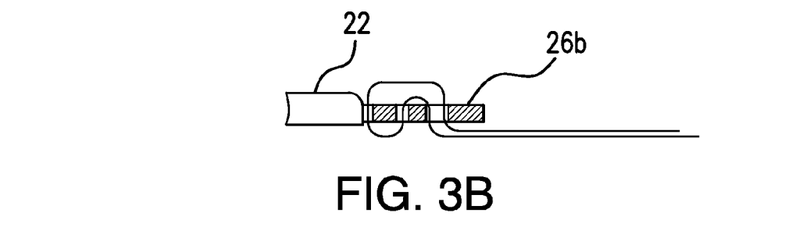
FIG. 3B is a sectional view taken along line 3B-3B of FIG. 3.

Next, one end of the waist strap 72 is threaded through the ladder lock 26b of wing component 22 of butterfly buckle 20. This interconnection is depicted in the cross section of FIG. 3B. The opposite end of waist strap 72 is similarly threaded through ladder lock 26b of the remaining wing component 22. The ends of waist strap 72 are then adjusted until the ladder buckle 60 is centered under the dog's breast bone and strap 72 is pulled snug. Next the left end of chest strap 74 is threaded through the ladder lock 26a of wing component 22 of Butterfly buckle 20. Then the right end of chest strap 74 is similarly threaded through ladder lock 26a of the opposite wing component. The torso component 24 of butterfly buckle 20 can then be used to join the opposing wing components 22 on the back of the animal. A leash 76 can be removably coupled to torso component 24 to complete the sling harness 70.

To remove body harness 70, the quick disconnect button 44 is depressed to release the right and left wing components 22 from the torso component 24. This releases the entire harness 70 from the animal. The animal can then step away from harness 70. To put the body harness 70 back on, it is laid on the floor as in FIG. 5. The left wing 22 is already inserted into the torso component 24. The animal places its front paws, one on each side of the bottom extent 74a of strap 74. The butterfly buckle 20 is lifted over the shoulders of the animal. Next, the right wing component 22 is brought up and coupled to the torso component 24 (as described above). The body harness 70 is on the animal. The leash 76 may be attached.

Harness with Footwear

Figure 9:
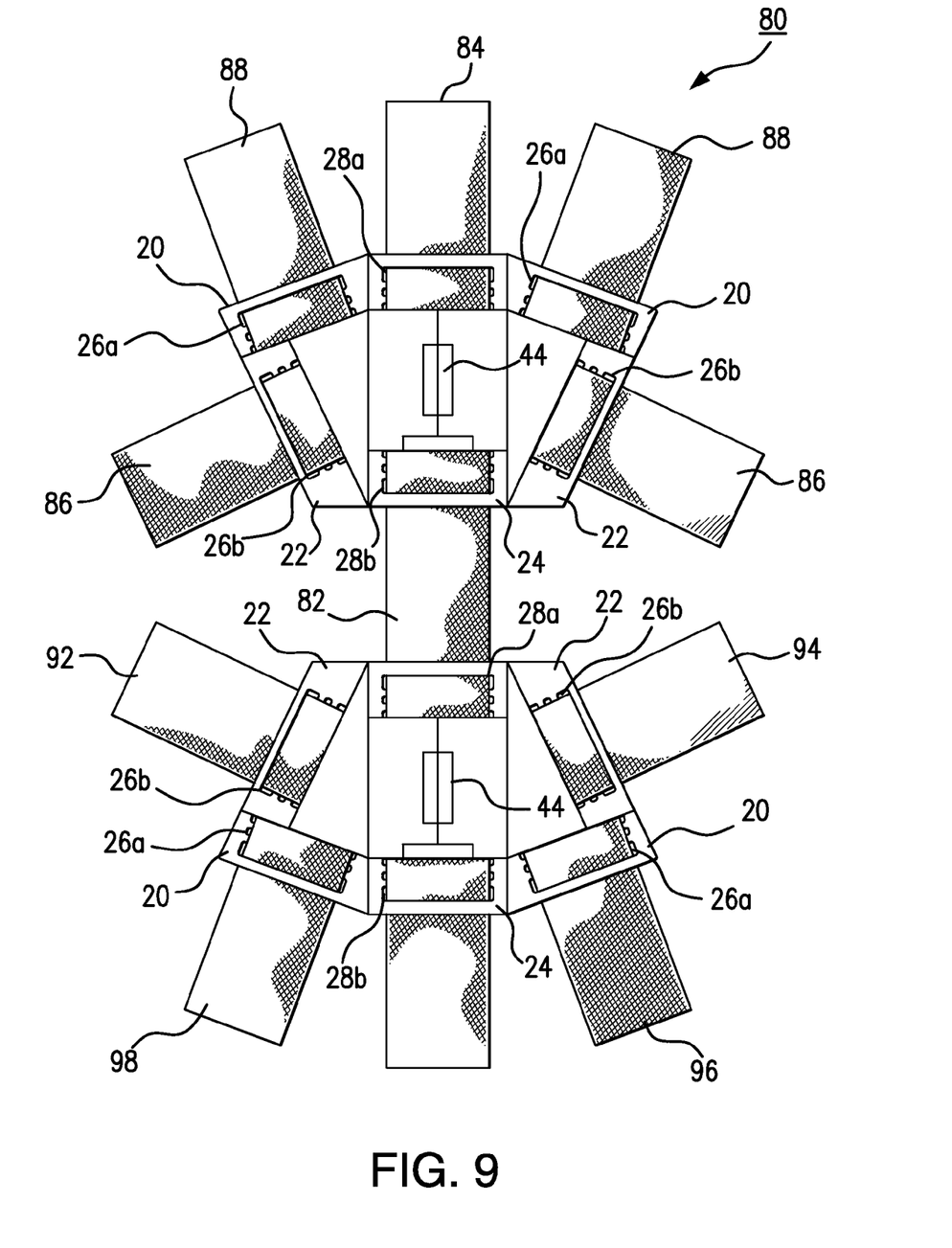
FIG. 9 is a top plan view of another harness and buckle assembly. This embodiment includes two of the butterfly buckles of FIG. 1. The buckles are connected by a short webbing strip. The first butterfly buckle connects a canine harness. The second butterfly buckle is connected to a footwear suspender. A strip of elastic connects to a dog collar.

FIG. 9 is a plan view of an additional harness arrangement. This is footwear harness arrangement 80 because it can be secured to both the chest of the animal and associated footwear. The footwear employed with this harness can be the footwear described in commonly owned U.S. patent application Ser. No. 61/673,975 entitled "Canine Footwear For Canine Suspenders And Canine Footwear Paw Insertion Guide" which was filed on Jul. 20, 2012. The contents of this prior application are incorporated herein for all purposes.

This embodiment employs two oppositely facing butterfly buckles 20. A length of webbing 82 is connected between the opposing ladder locks 28a/28b and is used in joining the two butterfly buckles 20 along the back of the animal. An additional length of webbing 84 is connected to ladder lock 28a and is used to securing the harness 80 to a collar. Webbing 84 is preferably elastic because the stress from the leash is intended to go through the shoulder and chest straps and not get transferred to the neck collar. A neck collar is used to carry identification, license tags and vaccination information.

Figure 10:
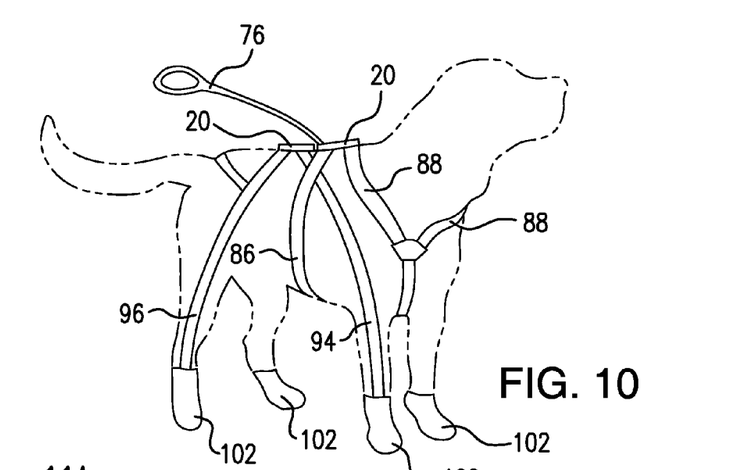
FIG. 10 is a depiction of the harness and buckle assembly of FIG. 9 in position upon a dog. The harness and buckle assembly permit footwear suspenders to be interconnected to the harness.

Once connected, the forwardly located butterfly buckle 22 has opposing straps 86 and 88 that are threaded through the corresponding portions ladder locks 26a and 26b. More specifically, a front shoulder strap 88 has opposing ends that are secured in ladder locks 26a and 26a of opposing wing components 22 of butterfly buckle 20. A waist side strap 86 has opposing ends that are secured in ladder locks 26b and 26b of opposing wing components 22 of butterfly buckle 20. As noted in FIG. 10, the front shoulder strap 88 goes about the right shoulder of the animal and over the right side of the chest. The waist strap 86 is positioned about the waist of the animal.

The rearward butterfly buckle 20 securing suspender straps for both the front and back legs of the animal. Namely, a front left leg suspender strap 92 is secured to ladder lock 26b. A front right leg suspender strap 94 is secured to ladder lock 26b. A rear left leg suspender strap 98 is secured to ladder lock 26a. A rear right suspender strap 96 is secured to ladder lock 26a. Each of these straps is coupled to an article of animal footwear 102. The straps can be permanently coupled to footwear 102 or releasably coupled via a clip.

Body Harness Arrangement

Figures 11, 11A:
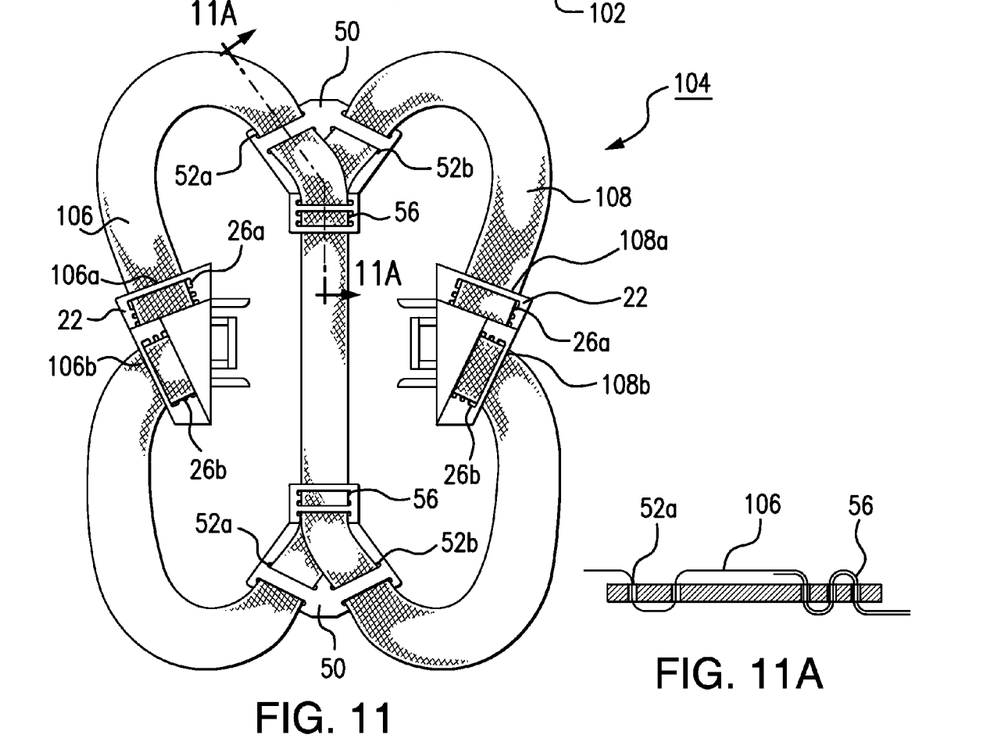
FIG. 11 is a plan view of a harness employing two "Y" buckles of FIG. 7.
FIG. 11A is a sectional view taken along line 11A-11A of FIG. 11.

A further alternative harness arrangement 104 is depicted in FIG. 11. FIG. 11 for the body harness just described. This arrangement 104 employs two straps 106 and 108. Each strap has first and second ends (106a/106b and 108a/108b) respectively. This embodiment also eliminates the use of a Ladder buckle 60 and instead uses two opposing Y buckles 50 and one butterfly buckle 20. Strap 106 has its first end 106a secured within the ladder lock 26a of a wing component 22 of butterfly buckle 20. Strap 106 is then threaded through Ladder lock 52a and 56 of the forward Y buckle 50 and then through the ladder locks 56 and 52a of the rearward Y buckle 50. The opposite end 106 is then secured to the ladder lock 26a of wing component 22. Notably, both ends 106a and 106b of strap 106 are secured to the same wing component of butterfly buckle 20. The opposite strap 108 is similarly secured. Namely, both ends 108a and 108b are secured to ladder locks 26a and 26b of the opposing wing component and the intermediate length 108 is similarly threaded through Y buckles 50. Straps 106 and 108 overlie one another along the space between the forward and rearward Y buckles 50. In this arrangement, each strap (106 and 108) is looped around one side of the animal.

In yet another option, the opposing ends 106a and 106b could be secured to the ladder locks (26a/26b) of the two different opposing wing components 22. Likewise, the opposing ends 108a and 108b could be secured to the ladder locks (26a/26b) of the two different opposing wing components 22. In other words, each wing component 22 would be secured to an end of one of the straps 106 and 108. This is the same as the prior embodiment, however, each strap (106 and 108) forms an S-shape around the body of the animal.

Although this disclosure has been described in terms of certain embodiments and generally associated methods, alterations and permutations of these embodiments and methods will be apparent to those skilled in the art. Accordingly, the above descriptions of example embodiments does not define or constrain this disclosure. Other changes, substitutions, and alterations are also possible without departing from the spirit and scope of this disclosure.

What is claimed is:

1. A harness and footwear assembly for an animal, the assembly comprising:
    a forward butterfly buckle comprising first and second wing components and a middle component, each of the wing components being releasably secured to the middle component, the first and second wing components each having first and second ladder locks;
    a rearward butterfly buckle comprising first and second wing components and a middle component, each of the wing components being releasably secured to the middle component, the first and second wing components each having first and second ladder locks;
    a back strap interconnecting the middle component of forward Butterfly buckle to the middle component of the rearward butterfly buckle;
    a first shoulder strap extending between the ladder locks of the first wing component of the forward Butterfly buckle;
    a second shoulder strap extending between the ladder locks of the second wing component of the forward butterfly buckle;
    a pair of forward suspender straps extending from the ladder locks of the first and second wing components of the rearward butterfly buckle;
    a pair of rearward suspender straps extending from the remaining ladder locks of the first and second wing components of the rearward butterfly buckle.

2. The harness assembly as described in claim 1 wherein the forward suspender straps are each coupled to an article of animal footwear.

3. The harness assembly as described in claim 1 wherein the rearward suspender straps are each coupled to an article of animal footwear.

4. The harness assembly as described in claim 1 wherein the first and second ladder locks of the first and second wing components of the forward butterfly buckle are disposed at approximately a 90 degree angle to one another.

5. The harness assembly as described in claim 1 wherein the first and second ladder locks of the first and second wing components of the rearward butterfly buckle are disposed at approximately a 90 degree angle to one another.

* * * * *